United States Patent  
Bass et al.

(10) Patent No.: US 12,416,175 B2  
(45) Date of Patent: Sep. 16, 2025

(54) MODULAR MANUFACTURE, DELIVERY, AND ASSEMBLY OF NUCLEAR REACTOR CORE SYSTEMS

(71) Applicant: TerraPower, LLC, Bellevue, WA (US)

(72) Inventors: Derek Bass, Wilmington, NC (US); Jesse R. Cheatham, III, Seattle, WA (US); Pavel Hejzlar, Kirkland, WA (US); Brian C. Johnson, Issaquah, WA (US); Calen Kaneko, Seattle, WA (US); Christopher A. Martin, Seattle, WA (US); Sean T Mosier, Wilmington, NC (US); Philip M. Schloss, Seattle, WA (US); Nathan Smith, Duvall, WA (US); Mark R. Werner, Bellevue, WA (US); Nicholas Kandabarow, Hampstead, NC (US)

(73) Assignee: TERRAPOWER, LLC, Bellevue, WA (US)

( * ) Notice: Subject to any disclaimer, the term of this patent is extended or adjusted under 35 U.S.C. 154(b) by 0 days.

(21) Appl. No.: 17/234,617

(22) Filed: Apr. 19, 2021

(65) Prior Publication Data

US 2022/0051811 A1 Feb. 17, 2022

Related U.S. Application Data

(60) Provisional application No. 63/066,778, filed on Aug. 17, 2020.

(51) Int. Cl.
G21C 19/06 (2006.01)
E04B 1/16 (2006.01)
(Continued)

(52) U.S. Cl.
CPC ............... *E04H 5/02* (2013.01); *E04B 1/167* (2013.01); *G21C 3/16* (2013.01); *G21C 3/322* (2013.01);
(Continued)

(58) Field of Classification Search
CPC ....... G21C 13/00; G21C 13/028; G21C 15/18
See application file for complete search history.

(56) References Cited

U.S. PATENT DOCUMENTS 3,154,471 A * 10/1964 Radkowsky ........... G21C 15/02
976/DIG. 188
3,350,277 A * 10/1967 Costes ..................... G21C 9/00
976/DIG. 102
(Continued)

FOREIGN PATENT DOCUMENTS

CN 201540764 U 8/2010
DE 2611063 A1 * 1/1978
(Continued)

OTHER PUBLICATIONS

United States Nuclear Regulatory Commission. Glossary: spent fuel pool. Accessed Jan. 31, 2024. <https://www.nrc.gov/reading-rm/basic-ref/glossary/spent-fuel-pool.html> (Year: 2024).*
(Continued)

*Primary Examiner* — Lily C Garner
(74) *Attorney, Agent, or Firm* — FisherBroyles, LLP; Jeremy P. Sanders

(57) ABSTRACT

A nuclear reactor is designed to allow efficient packing of components within the reactor vessel, such as by offsetting the core, and/or vertically stacking components. The in-vessel storage system can be separate from the support cylinder and these components can be fabricated and shipped separately and coupled together at the construction site. Furthermore, the in-vessel storage system can be (Continued)

located adjacent to the core rather than being located circumferentially around it, and may also be located beneath the heat exchanger to further improve packing of components within the vessel. Through these, and other changes, the delicate components can be manufactured in a manufacturing facility, assembled, and shipped by commercial transportation options without exceeding the shipping envelope.

10 Claims, 13 Drawing Sheets

(51) Int. Cl.
| | |
|---|---|
| *E04H 5/02* | (2006.01) |
| *G21C 3/16* | (2006.01) |
| *G21C 3/322* | (2006.01) |
| *G21C 3/328* | (2006.01) |
| *G21C 3/34* | (2006.01) |
| *G21C 13/028* | (2006.01) |
| *G21C 13/093* | (2006.01) |
| *G21C 13/10* | (2006.01) |
| *G21C 15/18* | (2006.01) |
| *G21C 21/02* | (2006.01) |

(52) U.S. Cl.
CPC ........... *G21C 3/328* (2013.01); *G21C 3/3432* (2019.01); *G21C 13/028* (2013.01); *G21C 13/093* (2013.01); *G21C 13/10* (2013.01); *G21C 15/18* (2013.01); *G21C 21/02* (2013.01); *G21C 19/06* (2013.01)

(56) References Cited

U.S. PATENT DOCUMENTS

| | | | | |
|---|---|---|---|---|
| 3,503,171 | A * | 3/1970 | Leon | C25B 11/093 |
| | | | | 52/249 |
| 4,050,985 | A * | 9/1977 | Yant | G21C 1/028 |
| | | | | 976/DIG. 188 |
| 4,053,359 | A * | 10/1977 | Pennell | G21C 5/06 |
| | | | | 976/DIG. 102 |
| 4,102,740 | A * | 7/1978 | Blum | G21C 19/00 |
| | | | | 376/458 |
| 4,111,747 | A * | 9/1978 | Eck | G21C 11/024 |
| | | | | 376/400 |
| 4,183,785 | A * | 1/1980 | Blum | G21C 19/00 |
| | | | | 376/458 |
| 4,255,236 | A * | 3/1981 | Robbins | G21C 7/00 |
| | | | | 376/209 |
| 4,655,996 | A * | 4/1987 | Artaud | G21C 1/03 |
| | | | | 376/404 |
| 4,737,336 | A * | 4/1988 | Jones, Jr. | G21C 19/32 |
| | | | | 976/DIG. 247 |
| 5,019,327 | A * | 5/1991 | Fanning | G21C 19/20 |
| | | | | 376/268 |
| 5,499,276 | A * | 3/1996 | Wakabayashi | G21F 9/32 |
| | | | | 376/172 |
| 2003/0089066 | A1 | 5/2003 | Nelson | |
| 2009/0120020 | A1 | 5/2009 | Akagi et al. | |
| 2009/0127427 | A1 | 5/2009 | Sato | |
| 2010/0177859 | A1 | 7/2010 | Yokoyama et al. | |
| 2010/0300013 | A1 | 12/2010 | Imaoka et al. | |
| 2012/0037198 | A1 | 2/2012 | Cantin et al. | |
| 2013/0047521 | A1 | 2/2013 | Yoder | |
| 2016/0049210 | A1* | 2/2016 | Filippone | F22B 1/063 |
| | | | | 376/406 |
| 2016/0196885 | A1* | 7/2016 | Singh | G21C 15/257 |
| | | | | 376/367 |
| 2018/0061511 | A1* | 3/2018 | Gibbons | G21C 19/50 |
| 2018/0137944 | A1* | 5/2018 | Abbott | G21C 3/54 |

FOREIGN PATENT DOCUMENTS

| | | | | |
|---|---|---|---|---|
| FR | 3016076 | A1 * | 7/2015 | ............... G21C 1/03 |
| JP | 49029558 | B | 8/1974 | |
| JP | S51148198 | A | 12/1976 | |
| JP | S552134 | A | 1/1980 | |
| JP | S55125484 | A | 9/1980 | |
| JP | H01248096 | A | 10/1989 | |
| JP | H03150495 | A | 6/1991 | |
| JP | 04279898 | A * | 10/1992 | |
| JP | H04293864 | A | 10/1992 | |
| JP | H0618685 | A * | 1/1994 | |
| JP | H0990073 | A * | 4/1997 | |
| JP | 2002341090 | A | 11/2002 | |
| JP | 2003172025 | A | 6/2003 | |
| JP | 2004093141 | A * | 3/2004 | |
| JP | 3950392 | B2 * | 8/2007 | |
| JP | 2015140764 | A | 8/2015 | |
| JP | 5838511 | B2 * | 1/2016 | |
| KR | 940004774 | B1 * | 5/1994 | |

OTHER PUBLICATIONS

PCT/US2021/028009 International Search Report and Written Opinion, dated Jul. 20, 2021, 13 pages.

* cited by examiner

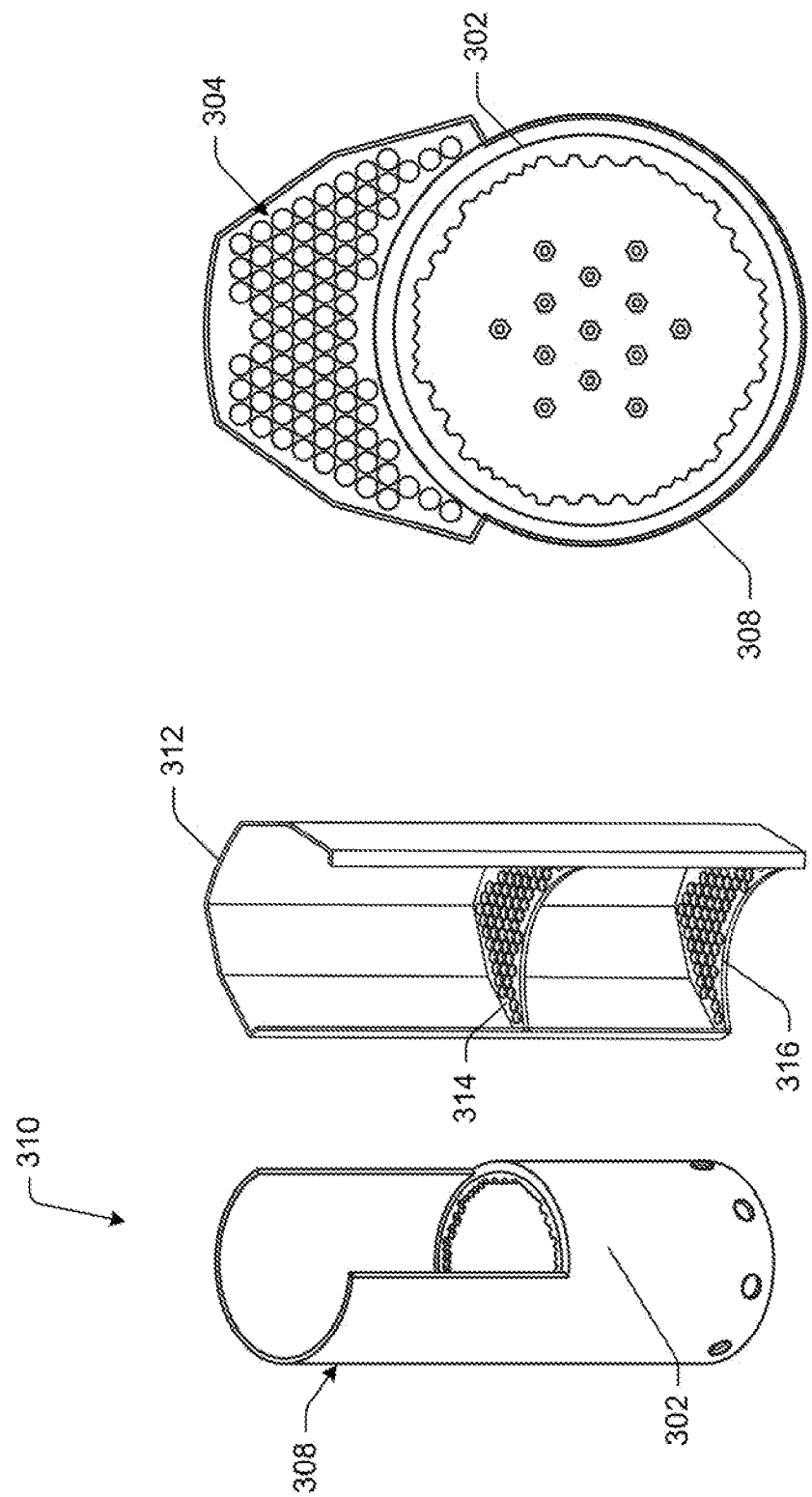

MODULAR MANUFACTURE, DELIVERY, AND ASSEMBLY OF NUCLEAR REACTOR CORE SYSTEMS

CROSS-REFERENCE TO RELATED APPLICATIONS

This application claims the benefit of U.S. Provisional Patent Application No. 63/066,778, filed Aug. 17, 2020, entitled "MODULAR MANUFACTURE, DELIVERY, AND ASSEMBLY OF NUCLEAR REACTOR," the contents of which is incorporated herein by reference in its entirety.

BACKGROUND

Nuclear reactor facilities are largely built on site, which create unique challengers due to the tight tolerances and delicate equipment that must be fabricated and installed within the reactor vessel. Furthermore, because of the size of nuclear reactor components, they are largely not conducive to fabrication away from the nuclear site prior to installation.

Nuclear reactors require a large number of very complex systems that must all work together to support the goal of the facility. It would be advantageous if a nuclear reactor facility is able to be constructed from modules that are fabricated, such as in a manufacturing facility where delicate equipment can be fabricated and pre-installed with the efficiency that a manufacturing facility provides, as well as reducing the number of systems, as well as simplifying the systems, to result in a more efficient design, construction, and assembly of the nuclear facility.

SUMMARY

One of ordinary skill in the art will readily understand that there are many advantages and benefits of designing and constructing a nuclear reactor according to embodiments and examples disclosed herein. For instance, many of the designs, layouts, and configurations described herein promote a nuclear reactor than can be largely manufactured in a manufacturing facility, and then shipped, as modules, to a construction site for final assembly. In this way, a nuclear reactor can be constructed to high tolerances and with a speed and efficiency afforded by a manufacturing facility and avoiding much of the typical on-site fabrication required by the large components that make up a nuclear reactor. In some cases, a nuclear reactor having a size commensurate with a 300 MWth, or a 500 MWth, or a 600 MWth, or larger facility can be largely manufactured in a manufacturing facility and modules that make up the nuclear reactor can be transported through commercial shipping options to a construction site.

According to some embodiments, a nuclear reactor vessel includes a support cylinder; and an in-vessel storage system, the in-vessel storage system being a separate component from the support cylinder. By forming these components as separate components, it opens up opportunities to ship these components through established shipping routes, such as by truck, rail, ship, or another standard carrier. In some cases, the in-vessel storage system is a ring that extends circumferentially about the support cylinder. In other cases, the in-vessel storage system is not concentric about the support cylinder, but rather, may be configured to be installed next to the support cylinder.

According to some embodiments, the in-vessel storage system is configured to be attached to the support cylinder at a nuclear construction site. It may be manufactured at a fabrication facility, such as a manufacturing plant, and shipped to the construction site as a module to be attached to the support cylinder at the construction site, and in some cases, after the support cylinder has been installed in place. For instance, the support cylinder may be pre-assembled with internal components prior to shipping.

The support cylinder may be installed into a nuclear reactor vessel in a location that is offset from a center of the nuclear reactor vessel. In some cases, the in-vessel storage system is located vertically underneath at least a portion of one or more heat exchangers.

In some examples, a nuclear reactor vessel has a cross-sectional geometry that is non-circular. For instance, the cross-section geometry of the reactor vessel may be ovoid, rectangular, rounded rectangle, or some other regular or non-regular geometric shape.

In some instances, the nuclear reactor vessel includes a central core region within the support cylinder. The nuclear reactor vessel may include a heat transport system. The heat transport system may include one or more heat exchangers, and may also include one or more pumps. In some examples, the heat transport system is located outside the support cylinder, or in some cases, partially outside the support cylinder. In other words, a portion of the heat transport system may be disposed within the support cylinder while another portion may be disposed outside the support cylinder.

In some embodiments, one or more of the components of the nuclear reactor vessel are modular and are configured to be shipped over land for assembly at the installation site. Any number of modules may be pre-assembled and shipped over land, such as, without limitation, a core module, a support cylinder module, a heat transport module, an in-vessel storage system module, top plate module, a reactor vessel module, a guard vessel module, and/or a guard vessel outer segment module. Upon arriving at a construction destination, the modules may be appropriately placed, arranged, coupled together, and placed in communication where appropriate.

According to some embodiments, a modular nuclear reactor includes a reactor vessel module; a heat transport module; a top plate module; and a guard vessel module; wherein one or more of the reactor vessel module, heat transport module, top plate module, and guard vessel module is manufactured in a factory and shipped to a nuclear reactor construction site.

The reactor vessel module may include a core barrel and an in-vessel storage system. In some cases, the core barrel and the in-vessel storage system are separate components that are configured to ship as separate modules.

According to some embodiments, the heat transport module is configured to be welded to the reactor vessel module at the construction site.

In some examples, the reactor includes a core barrel that may be configured to be installed into the reactor vessel module at a location that is off-center in the reactor vessel module.

Some examples include an in-vessel storage system which may be configured to be coupled to the core barrel such that the in-vessel storage system is not concentric about the core barrel. For example, the in-vessel storage system may surround less than 50% of a circumference of the core barrel.

In some examples, the heat transport module is configured to be installed above at least a portion of the in-vessel storage system within the reactor vessel module.

BRIEF DESCRIPTION OF THE DRAWINGS

FIG. 3A illustrates a support cylinder and fuel area, and an in-vessel storage system separate from the support cylinder; in accordance with some embodiments;

FIG. 3B illustrates a top view of the support cylinder of FIG. 3A, with the in-vessel storage system located adjacent to the support cylinder, in accordance with some embodiments;

DETAILED DESCRIPTION

This disclosure generally relates to methods and systems that allow components and assemblies of a nuclear reactor vessel and reactor core to be manufactured under a controlled environment, such as in a factory, packaged at the factory and shipped to a construction site, and then assembled on-site. While the following description is useful in the design and construction of a sodium-cooled fast reactor (SFR), many of the concepts disclosed herein may be equally applicable to other reactor types, and the disclosure should not be limited to SFR technology unless specifically stated.

In some cases, nuclear reactor vessel components and/or core components are designed and arranged to facilitate manufacture and shipping of the vessel and core components. In many cases, the result is a nuclear vessel that offers a more efficient way of packing the vessel and core components within the reactor vessel.

In some embodiments, the vessel and core components are sized to be adapted to commercial transportation, such as by trucking, ocean going vessels, trains, or other suitable commercial transport options. For example, in some cases, the vessel components are arranged to result in modules that are able to fit within shipping containers, such as standard cargo or freight containers less than about twenty feet in width, or less than about 10 feet in width, or less than about 102" in width, or less than about 8 feet in width.

The vessel components may be subdivided into sub-modules, such as, for example, a reactor core module, a support cylinder module, an in-vessel storage system module, a pump module, a heat exchanger module, a top plate module, a guard vessel module, and a guard vessel outer segment module, among others. Upon arriving at a construction destination, the modules may be appropriately placed, arranged, coupled together, and placed in communication where appropriate.

In some cases, the in-vessel storage system ("IVS") is fabricated as a separate component from the inner cylinder, which then becomes a shippable component of the reactor to be assembled on site. The IVS is one of the high-precision components of the reactor assembly and the ability to manufacture this component in a manufacturing facility, partially assemble it, ship it as a sub-assembly and then do final assembly on site creates significant advantages for reactor construction and installation.

In some examples, as shown, the IVS may be located below one or more heat exchangers. By separating and modularizing the components, they can be arranged in unique locations, such as by stacking components vertically (e.g., the IVS below one or more compact heat exchangers (CHX)).

In some examples, the reactor vessel may adopt a non-circular geometry. In some cases, a geometry other than circular allows tighter packing of components and assemblies within the reactor vessel.

Figure 1A:
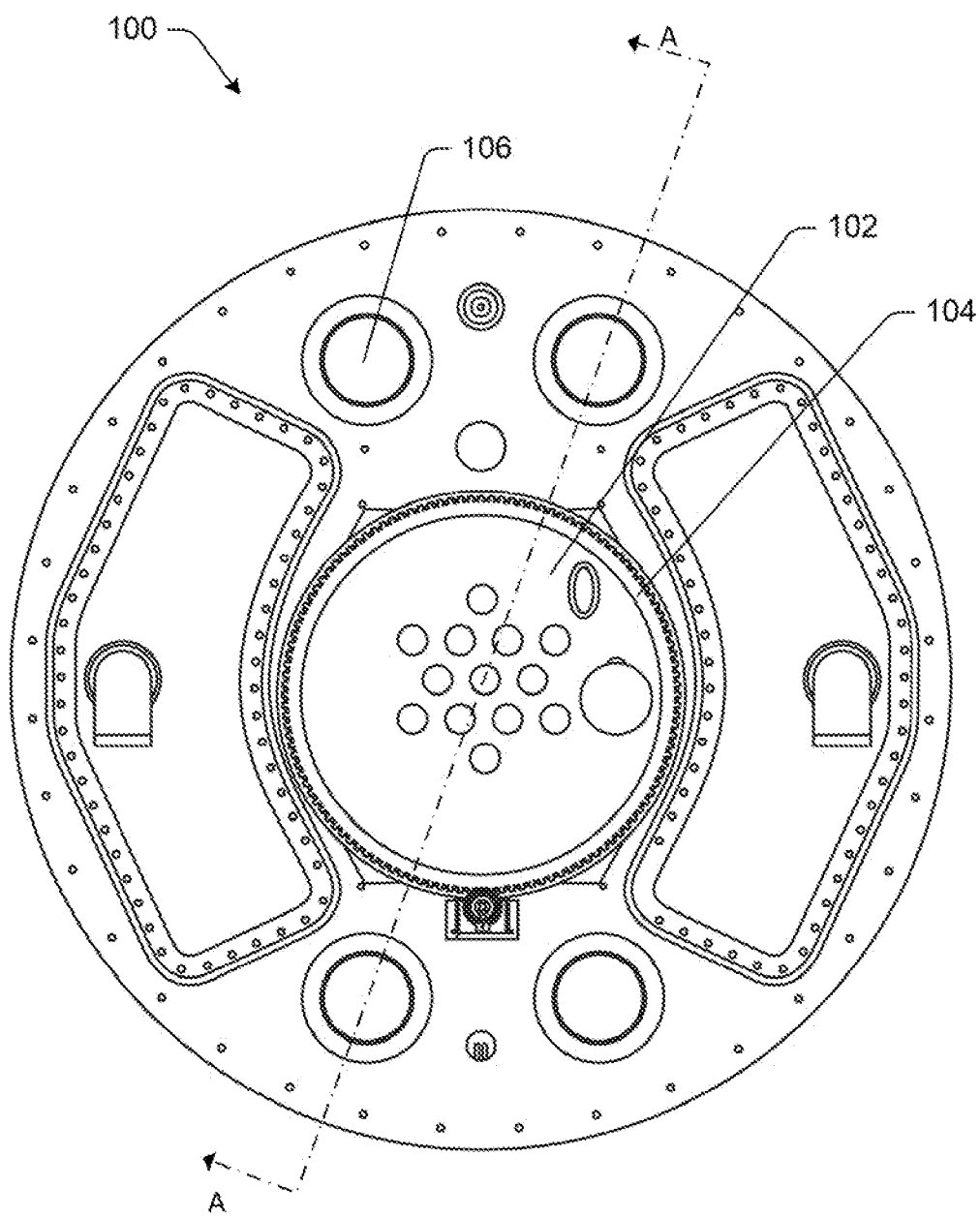
FIG. 1A is a schematic representations of a typical sodium fast reactor showing the layout of the systems in the reactor vessel, in accordance with some embodiments.
Figure 1B:
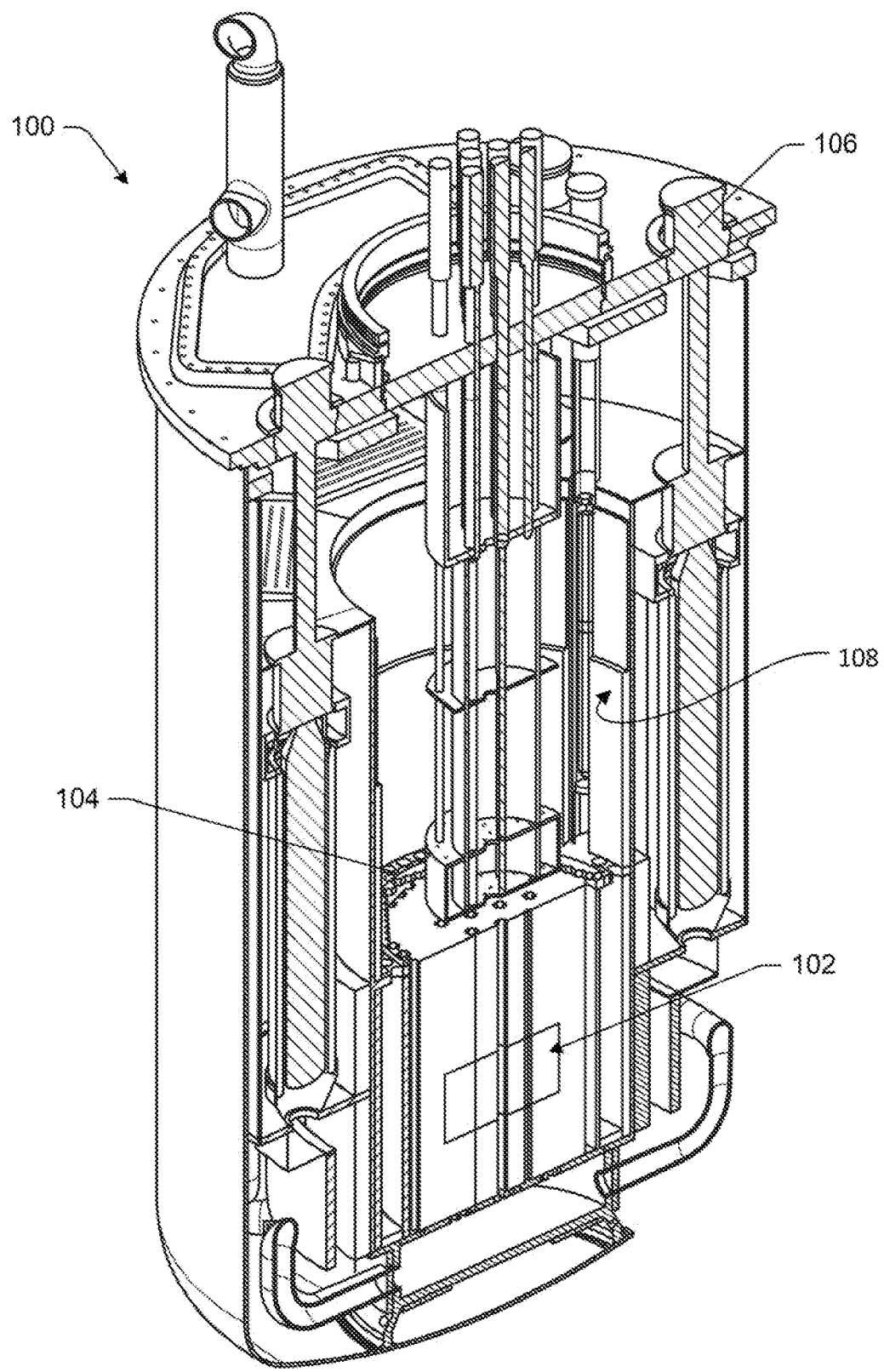
FIG. 1B is a schematic cross-sectional representation of FIG. 1A taken along the line A-A, illustrating the layout of components in a sodium fast reactor, in accordance with some embodiments.

FIGS. 1A and 1B illustrate a reactor vessel 100 having a core 102, an in-vessel storage system (IVS) 104, and four electromagnetic pumps 106. This may be a typical configuration in which the core 102 may include a support cylinder 108 that houses a core former ring, core barrel, IVS 104, and shielding, and is typically centrally located within the vessel 100 with other vessel systems disbursed concentrically about the core 102. In particular, the IVS 104 is typically coupled to the core barrel during manufacture and provides a storage space to support the changing (e.g., refueling, shuffling, etc) of core assemblies. In some embodiments, the core assemblies include fuel pins, control rods, neutron reflectors, neutron absorbers, or other components configured to fit within the IVS and be selectively inserted into, and removed from, the core.

In some cases, the reactor vessel 100 has an outside diameter on the order of 31.5 ft with a support cylinder having an outer diameter on the order of 16 ft. The sheer size and volume of these components make them difficult to fabricate and ship to a construction site. Typically, these components are fabricated on site and/or in-situ, which requires a great deal of skilled labor to precision fabricate and assemble the delicate components that form the core and the core internals.

According to some embodiments, the components are configured to be fabricated in a factory and shipped, such as by ground shipping, to the construction site. The components may be configured to be shipped by, for example, fabricating the components as separate components that fit within a predefined shipping envelope, reducing the size of the components, simplifying the reactor design to eliminate some typical components, as well as other strategies that will be described herein.

Figure 2B:
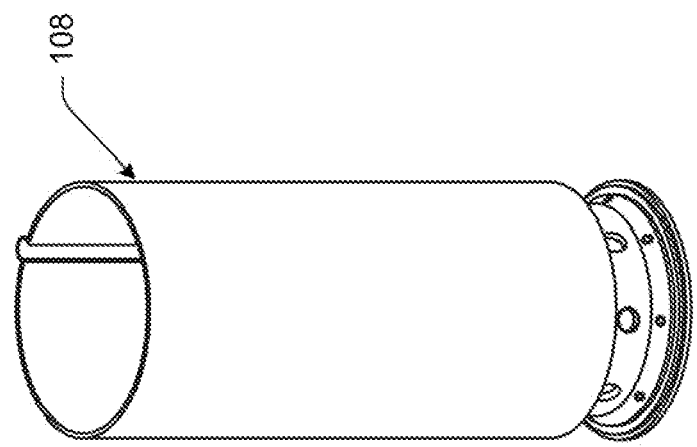
FIG. 2B illustrates a support cylinder of a nuclear reactor, in accordance with some embodiments.
Figure 2A:
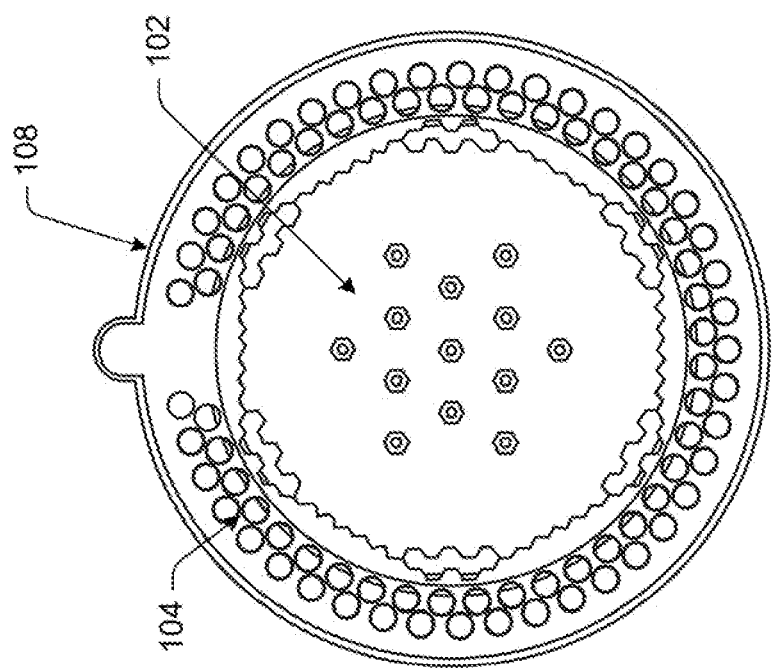
FIG. 2A illustrates a top view of a reactor support cylinder, core barrel with fuel area, and in-vessel storage system located concentrically around the core barrel, in accordance with some embodiments.

With reference to FIGS. 2A and 2B, a support cylinder 108 is shown that may typically form a part of the reactor core. The support cylinder 108 typically is outfitted with the core, core former ring, core barrel, IVS 104, and shielding inside the support cylinder 108 (core internals). In typical nuclear reactors, these core internal components are formed integrally as a single module. Because of their large size, which may be 16 feet in diameter, or larger, these core internals are not conducive to being manufactured in a manufacturing facility and shipped to the construction site, but rather, are largely fabricated on site.

According to some embodiments, the IVS 104 may be formed as a separate component from the core barrel and support cylinder 108. In these cases, the IVS 104 may be fabricated and assembled in a manufacturing facility and shipped to the construction site as a module, where it can be coupled to the support cylinder, core barrel, and/or other components. Prior reactor designs have formed the IVS and core barrel as a single piece, which was typically not able to be shipped due to size and/or delicacy of the components. Forming these as separate modules allows the components to be fabricated and shipped to the construction site for final assembly on site.

With reference to FIGS. 3A and 3B, in some embodiments, the support cylinder 308 is formed integrally with the core barrel 302 to form a core module 310. Notably, the IVS 304 is not within the support cylinder 308 nor is it integrally coupled to the core barrel 302. The IVS 304 may have its own housing 312 and may include an upper support 314 and a lower support 316. The housing 312, upper support 314, and lower support 316 may be fabricated in a manufacturing facility and shipped as an IVS module 304 to the construction site. In some embodiments, the IVS module 304 is configured to fit within a shipping envelope.

As used herein, the term "shipping envelope" is a broad term and is used to refer to a maximum available size, volume, or weight for commercial transport. A shipping envelope may refer to any suitable shipping method, such as ocean-going vessel, air freight, and/or overland transport vehicle (e.g., train, truck, van, etc.). In some embodiments, a shipping envelope, such as for overland truck transport, is about 36, 48, 53, or more feet long, 8.5 ft wide, and 13.5 ft high (or 14 ft high, or 14.6 ft high, or more depending on the desired route), and having a weight of up to about 47,000 lbs (up to 80,000 lbs including the combined weight of the vehicle and load). In some cases, the shipping envelope may be larger and may be considered an oversize load that may be shipped overland by adhering to additional regulations. In any event, one of the benefits described by embodiments herein is the design of the nuclear reactor that not only reduces overall size and/or number of components, but also creates modules that fit within a shipping envelope to allow the modules to be largely fabricated in a manufacturing facility and shipped (e.g., overland transport) to a construction site for assembly.

For instance, as described with reference to FIGS. 3A and 3B, the core module 310 may be fabricated in a manufacturing facility and may include the support cylinder 308, the core barrel, core, and other delicate reactor internals pre-installed prior to transporting the core module 310 to the construction site. This avoids having to separately crate, ship, fabricate, and assemble the delicate reactor internals at the construction site where quality control is significantly more difficult than in a manufacturing facility. The result is greater efficiency, tighter tolerances, faster manufacturing, more efficient assembly at the construction site, and greater safety in the resulting reactor.

The IVS module 304 may likewise be fabricated in a manufacturing facility and be shipped as a separate component with the delicate internals already installed. At the construction site, the IVS module 304 may be coupled to the core module 310 through any suitable technique, such as welding, bolts, fasteners, adhesives, clips, straps, keyways, flanges, or some other suitable coupler or combination of couplers. The IVS module 304 is a high-precision component, and historically has required a great deal of labor and equipment at the construction site in order to fabricate these components to the required tolerances. By designing a reactor as described herein, the fabrication and manufacturing of the IVS module 304 can be largely shifted to a factory, where the modules can be manufactured faster, with higher tolerances, higher accuracy, and better quality. As described herein, embodiments allow the IVS module 304 to be manufactured in a manufacturing facility and shipped to a construction site where it can be installed and coupled to the reactor barrel and/or reactor vessel.

In addition to designing the reactor as modules configured for transport, the modules themselves may offer a reduction in size to further facilitate transport of the assembled modules. For example, according to some embodiments, the support cylinder 108 of FIG. 2B is about 16 ft in diameter, while the support cylinder 308 of FIG. 3B is about 13 ft in diameter. This is a significant difference when shipping the modules and, in many cases, the 16 ft diameter support cylinder 108 is unable to be shipped overland, while the support cylinder of FIG. 3B is able to be shipped overland. This enables the core module 310 to be fabricated in the manufacturing facility with the core internals prefabricated, assembled, and installed within the core module 310 prior to shipping. Once delivered to the reactor site, the modules can be assembled, such as by coupling the IVS module 304 to the core module 310.

Figure 4A:
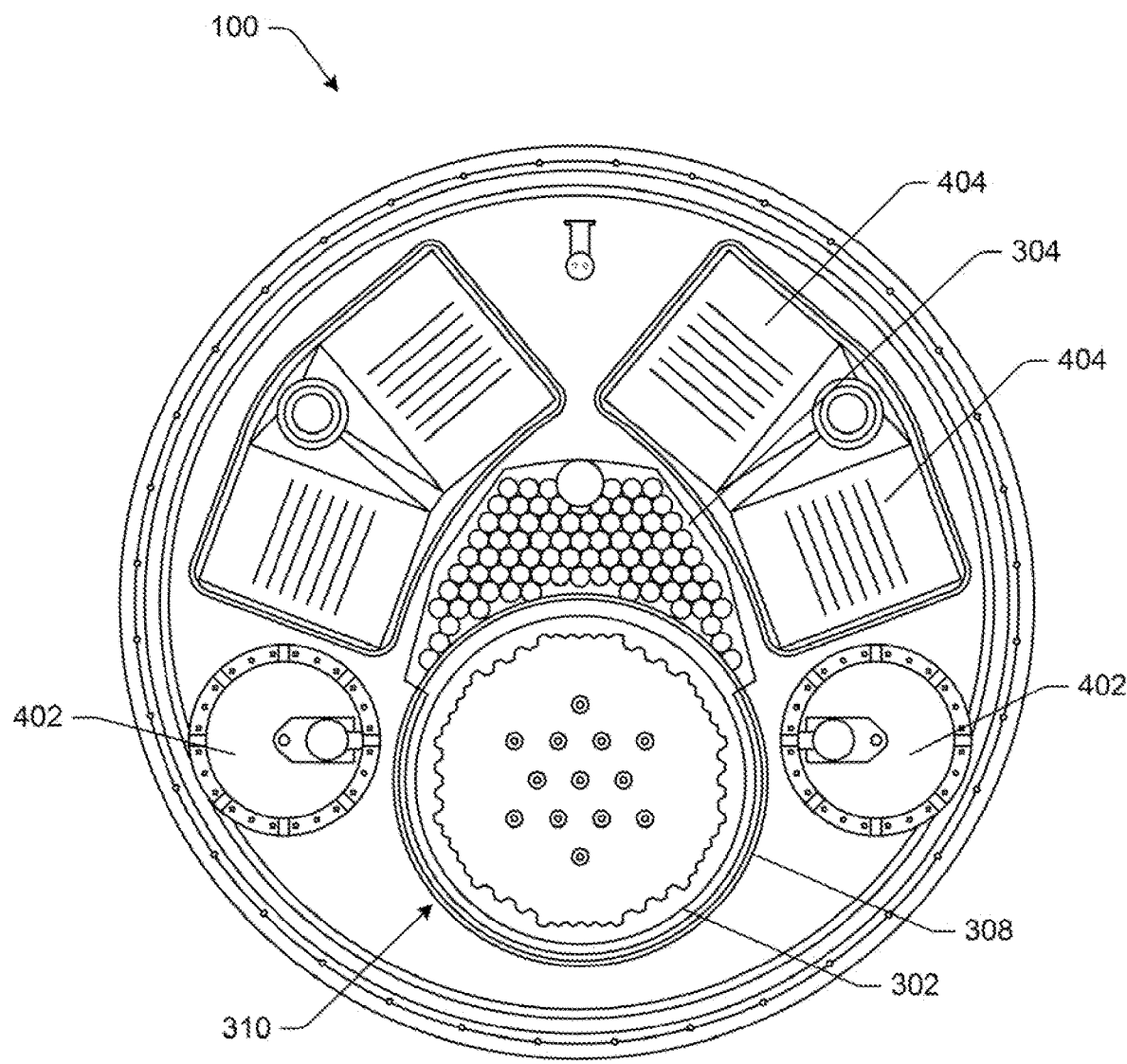
FIG. 4A illustrates a top view of a reactor vessel with a reactor core positioned off-center within the reactor vessel and an in-vessel storage system located adjacent the reactor core, in accordance with some embodiments.
Figure 4B:
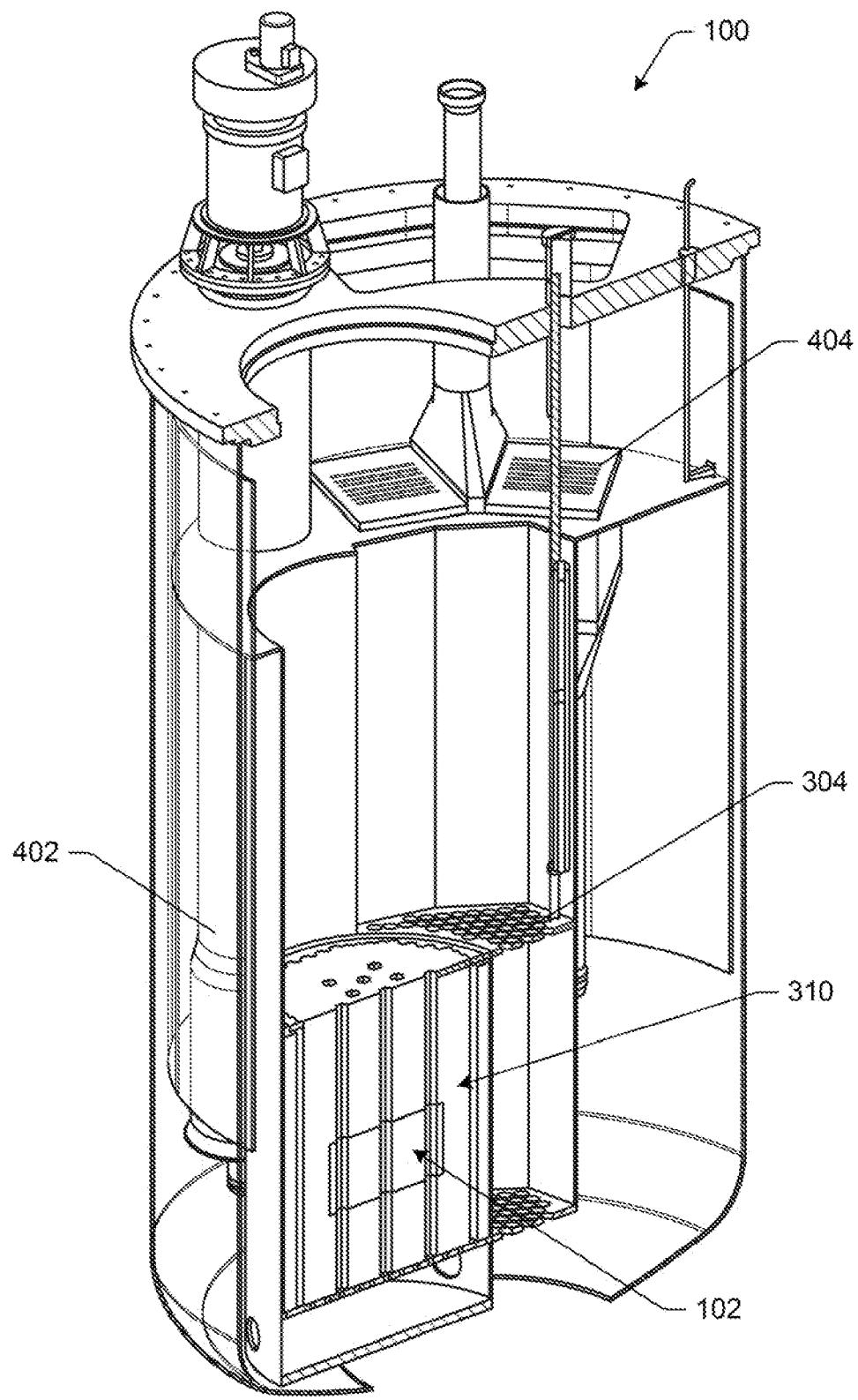
FIG. 4B illustrates the reactor vessel of FIG. 4A from a perspective view showing the reactor vessel components in an example layout, in accordance with some embodiments.

FIGS. 4A and 4B illustrate example embodiments showing a layout of components within a reactor vessel 100. Notably, in some embodiments, the core module 310 is located off-center with respect to the reactor vessel 100. In some cases, locating the core module 310 off-center relative to the reactor vessel 100 allows additional reactor vessel components to be more efficiently packed within the reactor vessel 100, thus potentially either reducing the overall size of the reactor vessel 100, allowing additional components to be located within the reactor vessel 100, or both. Other advantages will become readily apparent to those of ordinary skill in the art upon reviewing this disclosure.

As illustrated, the core module 310 is located off-center in the reactor vessel 100, two pumps 402 may be located adjacent the core module 310, and heat exchangers 404 may be located within the reactor vessel 100. Contrary to prior reactor vessels 100, the layout is asymmetric and in some cases, is designed to allow efficient packing of the components within the reactor vessel 100, which in some cases, allows the reactor vessel to be reduced in size as compared with a symmetrical distribution of reactor vessel components.

In addition, an in-vessel handling machine (IVHM) (not shown) may be provided to manipulate reactor core assemblies to selectively move the reactor core assemblies between the IVS module 304 and the core module 310. The IVHM may be positioned at a location that is near the boundary between the core module 310 and the IVS module 304, and an IVHM arm may be configured to reach core assemblies within the core module 310 and the IVS nodule 304 that are furthest away from the IVM. In other words, the IVHM arm may be configured to reach the opposing side of the core module 310 and also reach to the opposing side of the IVS module 304.

Figure 5A:
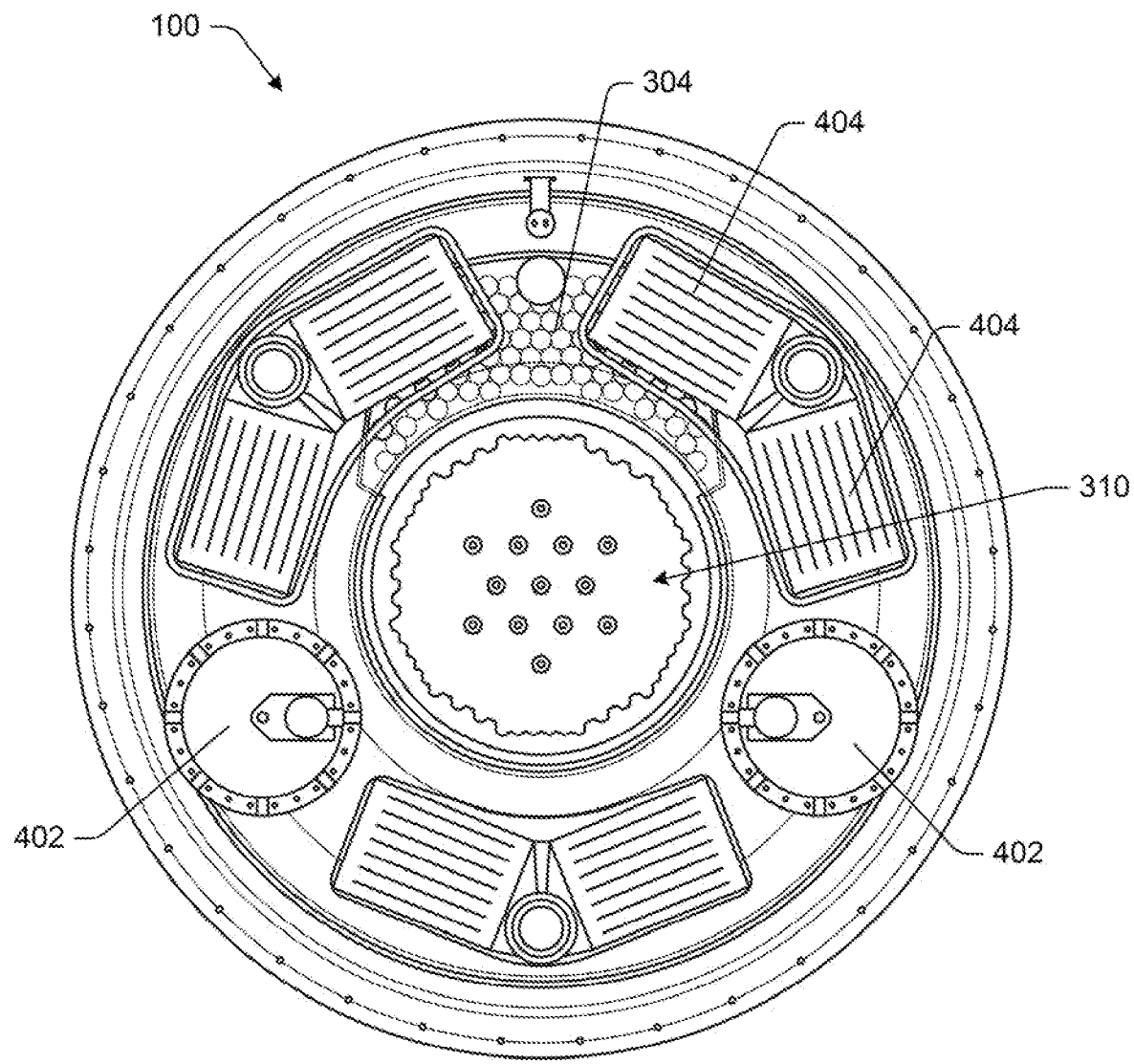
FIG. 5A illustrates a top view of a reactor vessel with an in-vessel storage system located adjacent the core, in accordance with some embodiments.
Figure 5B:
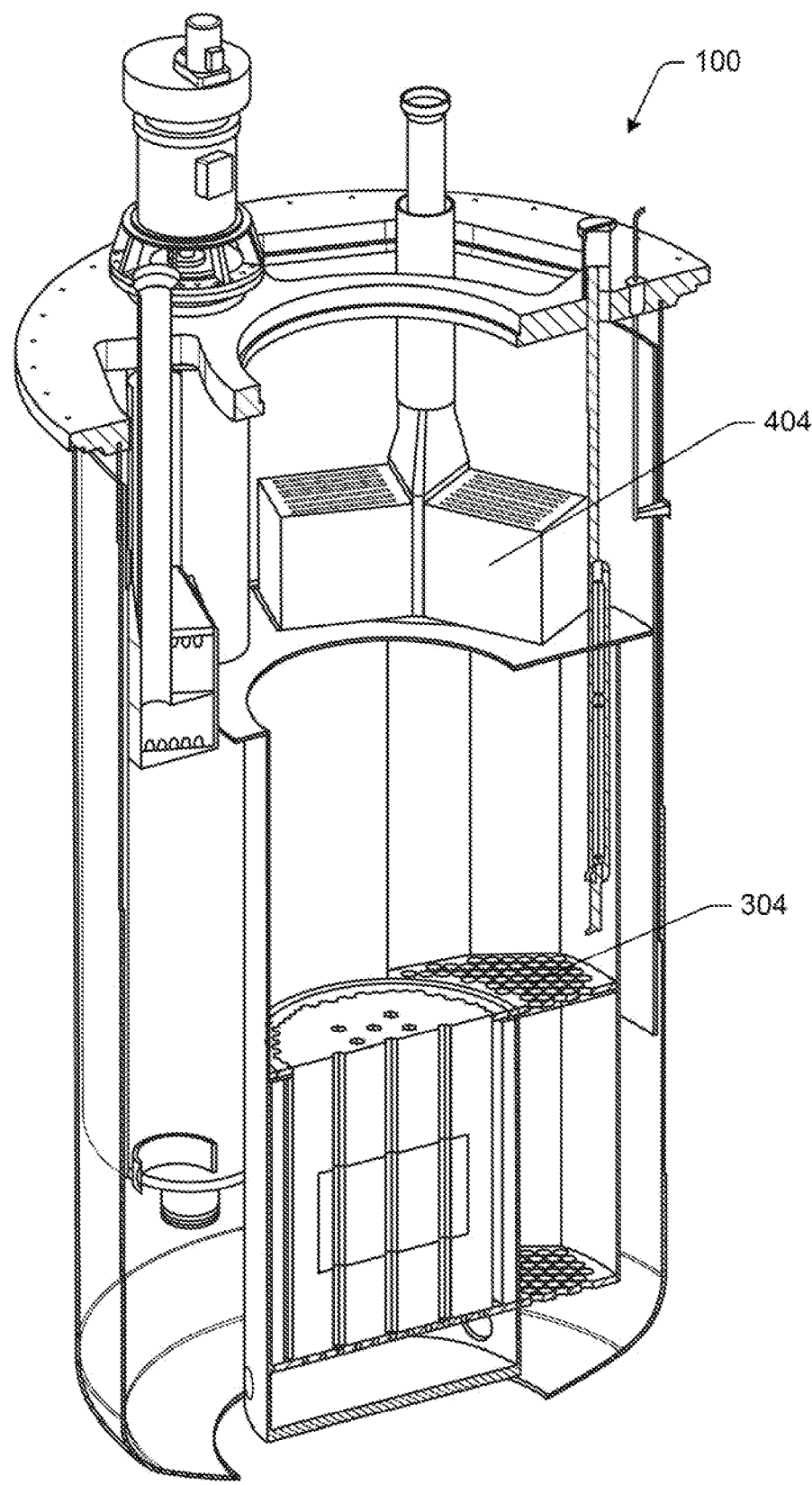
FIG. 5B illustrates the reactor vessel of FIG. 5A from a perspective view showing the reactor vessel components in an example layout, in accordance with some embodiments.

FIGS. 5A and 5B illustrate additional embodiments of component layout within a reactor vessel 100. A core module 310 is located in the center of the reactor vessel 100 and the IVS module 304 is located adjacent to the core module 310 and notably, is not concentric with the core module 304 in some embodiments. While the IVS module 304 may extend around a portion of the core module 310, in some embodiments the IVS module 304 extends less than 50% around the circumference of the core module 310, or less than about 40%, or less than about 30% or less than about 25% of the circumference of the core module 310. An IVHM (not shown) may be located above the core module 310 and the IVS module 304 to facilitate the loading and unloading of core assemblies within the core module 310.

In some cases, one or more heat exchangers 404 may be located above the IVS module 304. Typically, the IVHM requires a space above the IVS module 304 that is about equal to the height of the IVS module 304 plus clearance to allow it to lift core assemblies out of the IVS module 304 and position them into the core module 310, and vice versa. In some cases, the core assemblies are on the order of about 12 ft long, and the IVHM requires sufficient space above the core module 310 and the IVS module 304 in order to lift and relocate core assemblies. Most typical reactor configurations locate the heat exchangers radially outward from the IVS module 304 and not in vertical alignment therewith. However, as shown in FIG. 5B, one or more heat exchangers 404 may be located directly above the IVS module 304. In some cases, compact heat exchangers (CHX) may be utilized to minimize height impacts to the reactor vessel 100. Further, multiple CHXs may be utilized, such as 3, 4, 6, 8, or more CHXs 404 in order to share and distribute the thermal load between multiple CHXs 404.

In some examples, locating the IVS module 304 underneath the heat exchangers 404 allows a reduction in the diameter of the reactor vessel 100, such as a reduction of about 8%, or about 10%, or about 12% or more. The reduction in diameter is significant because reducing the diameter of the reactor vessel 100 additionally reduces material cost, construction cost, shielding required, excavation, labor, and allows the reactor vessel 100 to more easily be segmented into pieces suitable for shipping.

In some cases, locating the IVS module 304 below one or more heat exchangers 404 requires an increase in the height of the reactor vessel 100. The other components, such as the support cylinder may not need to be resized in order to accommodate a change to the diameter of the reactor vessel.

As described, there are advantages and benefits to fabricating major components of a nuclear reactor in a factory setting and shipping the components, which may be assembled into modules, to a construction site for final assembly and installation. According to some embodiments, modules of a nuclear reactor and a reactor core are designed to be shippable, such as by fabricating modules with a cross-sectional dimension smaller than 20 ft. For example, for modules that are substantially cylindrical, they may be designed to have a diameter of less than about 20 ft. For modules of other cross-sectional shapes, such as rectangular, ovoid, or some other regular or non-regular shape, they may be designed such that the maximum cross-sectional dimension is less than about 20 ft.

In some cases, modules may be sliced cross-sectionally to form sub-modules. For example, a support cylinder may be sliced into two or more segments by separating the support cylinder along a cross-sectional line. The segments may be coupled together at the construction site, such as by welding, bolting, or other suitable structure.

Figure 6:
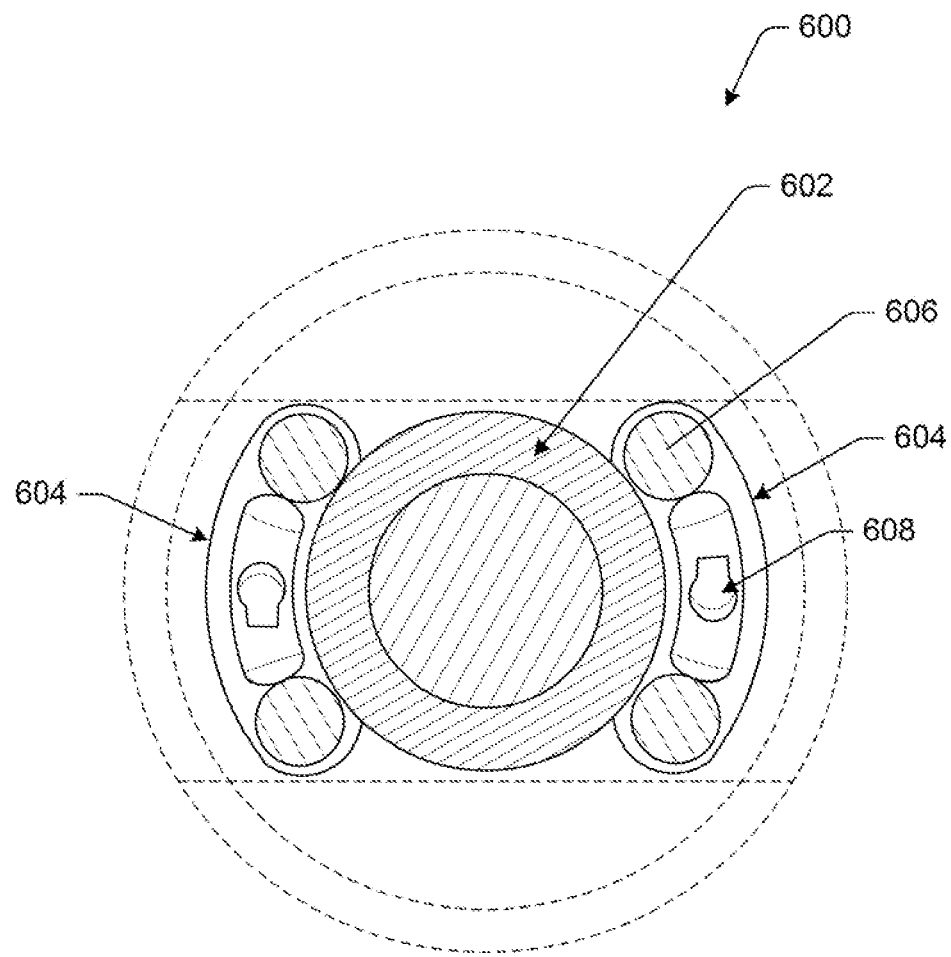
FIG. 6 illustrates a top view of reactor vessel modules and an example asymmetric layout, in accordance with some embodiments.

With reference to FIG. 6, a nuclear reactor 600 may include a reactor vessel module 602, and one or more heat transport modules 604. The reactor vessel module 602 may include a core, core barrel, support cylinder, IVS, and other components. In some cases, the reactor vessel module 602 can be designed to be less than about 20 ft in diameter. This sizing facilitates shipping the reactor vessel module 602, and in some cases, the reactor vessel module 602 can be fabricated and assembled in a manufacturing facility prior to shipping. This allows the delicate reactor core internals to be fabricated and installed within the reactor vessel module 602 prior to shipping. Once the reactor vessel module 602 arrives at the construction site, it can be installed and coupled to other modules and components as necessary, which improves the time to construct a nuclear reactor while providing for higher quality components and requires only modular assembly techniques rather than delicate on-site fabrication.

The heat transport modules 604 may each include one or more pumps 606 and one or more heat exchangers 608. The heat transport modules 604 may be fabricated and assembled in the manufacturing facility before transport to the construction site, and once on site, coupled to the reactor vessel module 602. The heat transport modules 604 may be mechanically coupled to the reactor vessel module 602, such as by welding, bolts, or any other suitable attachment structure or mechanism or combination of techniques. The heat transport modules 604 may additionally be fluidically coupled to the reactor vessel module 602 to allow fluid communication between the modules. The heat transport modules 604 may likewise be constructed to have a largest cross-sectional dimension less than about 20 ft, to facilitate fabricating and assembling the heat transport modules in a factory and then shipping the assembled modules to a construction site.

A top plate 802 (FIG. 8), may be fabricated and shipped as a separate component and installed on the top of the reactor vessel module 602 and the one or more heat transport modules 604.

A shippable reactor module can thus be fabricated as sub-modules in a factory prior to transporting the submodules to a construction site and assembling the sub-modules together to form the reactor module. In some embodiments, the reactor module includes sub-modules such as a reactor vessel module 602, one or more heat transport modules 604, a top plate 802, a guard vessel, and an outer guard vessel. In some examples, the guard vessel and/or outer guard vessel (or other modules) can be divided into multiple pieces suitable for shipping and assembled on-site, as required.

Figure 7:
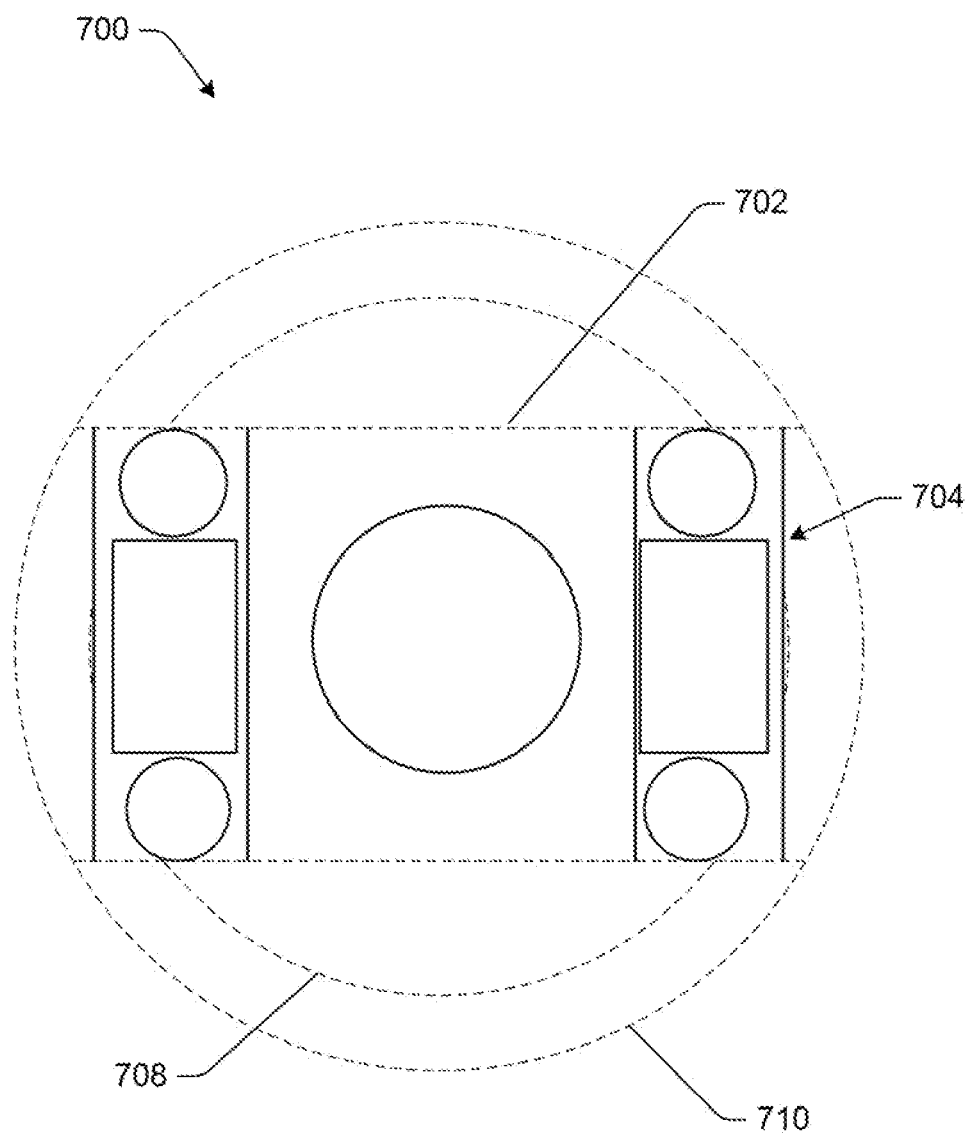
FIG. 7 illustrates a top view of reactor vessel modules and an example asymmetric layout, in accordance with some embodiments.

With reference to FIG. 7, a nuclear reactor 700 may include a nuclear reactor vessel module 702, one or more heat transport modules 704, a top plate 802, a guard vessel 708 and an outer guard vessel 710. As described elsewhere herein, the modules may be configured to have a maximum cross-sectional dimension of less than about 20 ft to facilitate the modules being shipped to the construction site. In the example of FIG. 7, the modules are designed for simpler fabrication and ultimate assembly by using flat plate construction (as opposed to spin forming or rolling) to simplify manufacturing and assembly steps. The result is a nuclear reactor that is highly factory fabricatable with only minimal field fabrication steps required to assemble the modules. The result is a modular reactor that is largely fabricated in a factory and the modules are shipped and assembled at the construction site.

Figure 8:
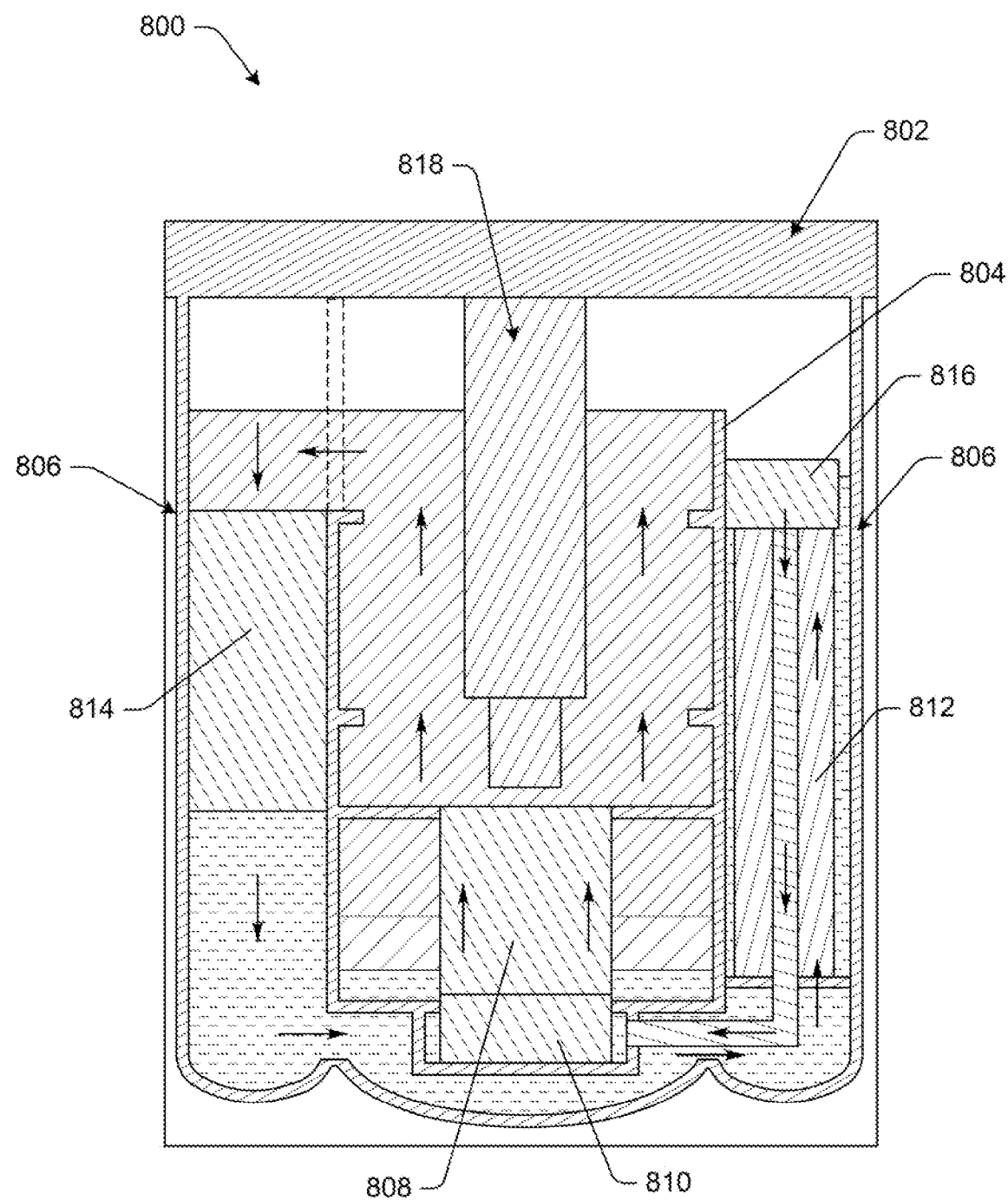
FIG. 8 illustrates a cross sectional schematic view of a reactor vessel showing internal flow, in accordance with some embodiments.

FIG. 8 illustrates a schematic cross-section of a reactor vessel 800 (such as shown in FIGS. 6 and 7) showing fluid flow through the reactor vessel module 804 and heat transport modules 806. The reactor vessel module 804, which in some cases includes a core 808 and receptacles 810, is in fluid communication with the heat transport modules 806. The heat transport modules 806 include one or more pumps 812, one or more heat exchangers 814, a discharge plenum 816 and various piping. An Upper Internal Structure (UIS) 818 may also be provided to provide guides for control rods, drivelines, and instrumentation, as well as flow path for cooling exiting core 808.

Once the reactor modules are assembled, fluid may flow through the modules as indicted by the arrows of FIG. 8, for example, being driven by one or more pumps 812, into the bottom of the core 808, up through the reactor vessel 804, into the heat exchanger 814, and returning to the pump 812. Of course, other components may be present, such as more than one pump, additional heat exchangers, and others.

Figure 9A:
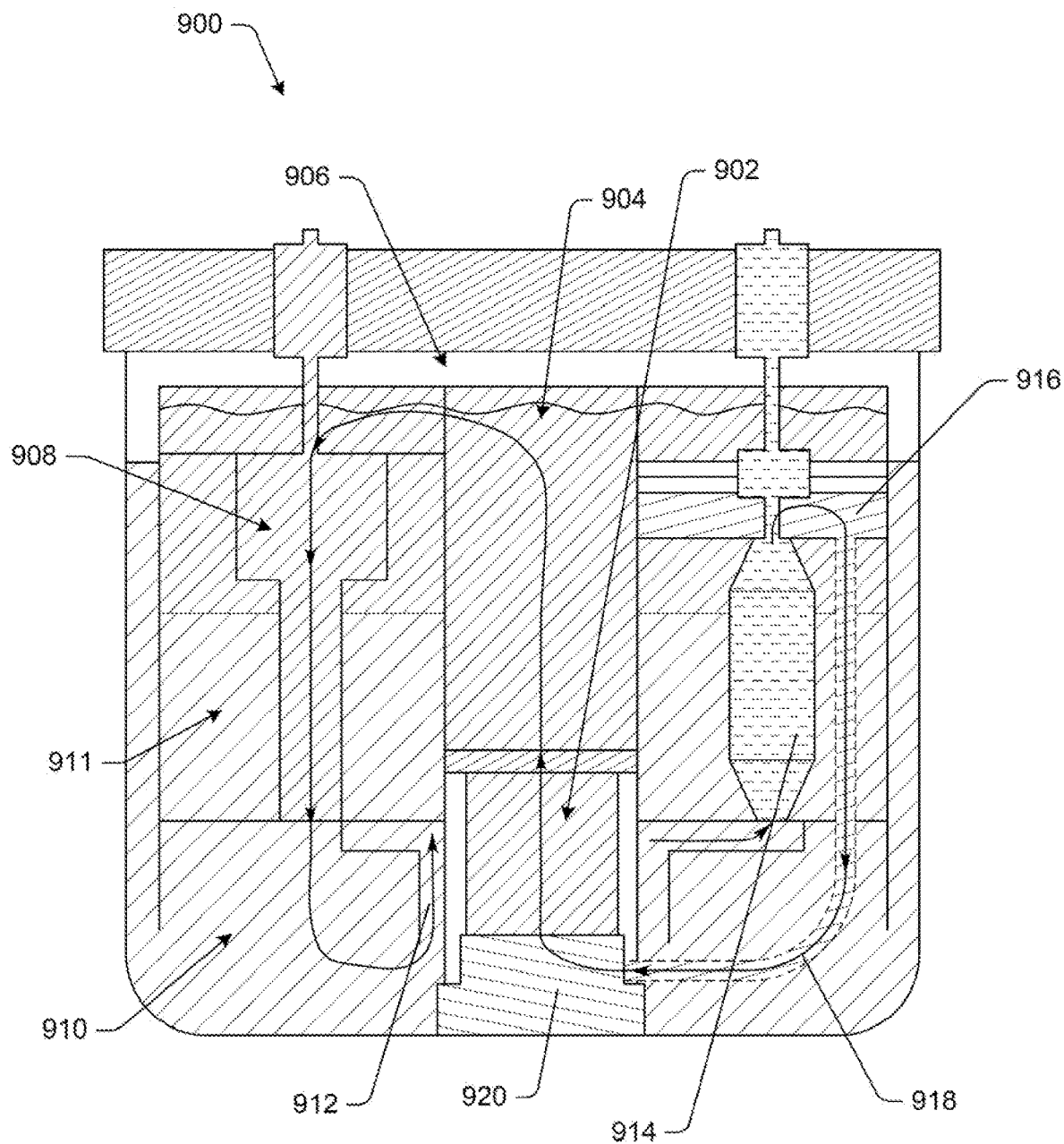
FIG. 9A shows a schematic cross-sectional view of a flow path of a nuclear reactor configuration, in accordance with some embodiments.
Figure 9B:
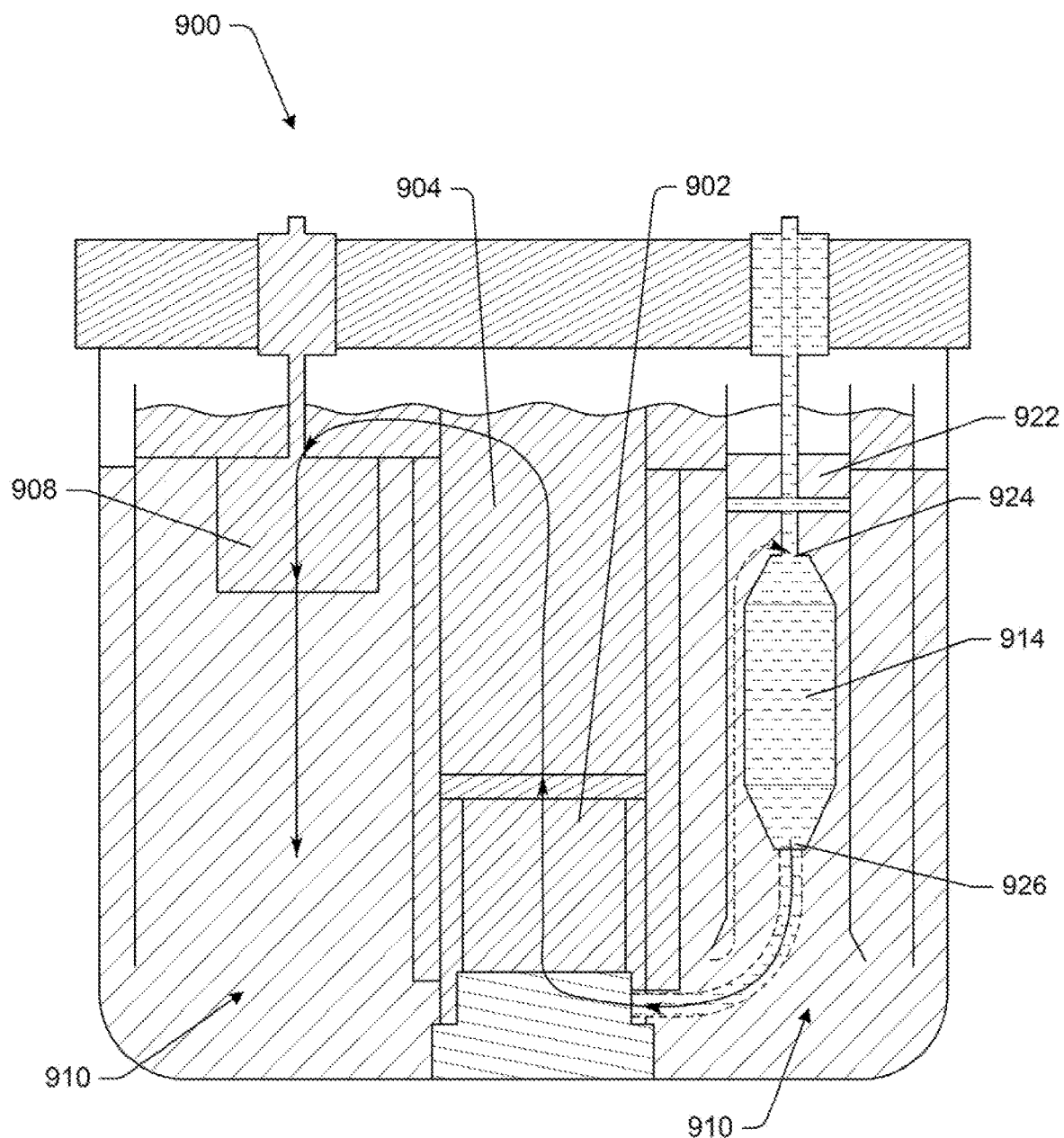
FIG. 9B show a cross-sectional schematic view of an alternative configuration for a reactor module configured for natural circulation, in accordance with some embodiments.

Additional details of fluid communication are illustrated in FIGS. 9A and 9B, which show cross-sectional schematics of a reactor core module 900 showing alternate configurations. As illustrated comparatively between FIGS. 9B and 9A, the configuration of FIG. 9B eliminates a large portion of the typical internal flow structure and pool separation structures, and effectively eliminates the mating seal from the primary sodium pump design that are illustrated in FIG. 9A. The configuration illustrated in FIG. 9B also provides for a much larger cold pool volume as compared with FIG. 9A, which contributes to safety, as well as provides a simplified flow path for both power operations and natural circulation.

In addition, the pump tank structure and pump extraction of FIG. 9B can be accomplished without navigation of tight tolerance penetrations and reduces, or eliminates, the potential for cold pool to hot pool bypass in the event of a pump discharge plenum leak or failure. The pump tank may also provide for use of a mechanical pump in place of an electromagnetic pump, and in some cases, can more readily adapt to changes in the pump length through the dedicated tank sodium space.

Modularization of the reactor components is improved by the reduction of structures that would require assembly and welding on-site such as, for example, the pool separation plates inlet plenum, support cylinder to pump plenums, and pool separation plates. Factory fabrication can be more readily accomplished for internal parts and shipped to site for final assembly and welding.

With reference to FIG. 9A, fluid is heated in the core 902 where it rises, due to natural circulation, pump input flow, or both, to the hot pool 904. The level of fluid is regulated to maintain a gas space 906 above the fluid level. Fluid from the hot pool 904 enters the heat exchanger 908 and flows downward to the cold pool 910 at the exit of the heat exchanger 908. An intermediate pool 911 is a relatively stagnant portion adjacent the cold pool and partially contributes volume to the cold pool 910. The cold fluid enters a suction plenum 912 of the primary sodium pump 914, is drawn up through the primary sodium pump 914 and exits the top of the primary sodium pump 914 at a high pressure to low-pressure interface 916 that is sealed against mixing with the hot pool 904. The high-pressure to low-pressure interface 916 is a critical component that inhibits mixing between the hot and cold pools. Any leakage of the seals will degrade the operation of the nuclear reactor. Critical components like this that have an impact on reactor operation, efficiency, or safety are very difficult to fabricate on-site. Similarly, long internal pipe runs, such as pipe 918, that carry fluid from the primary sodium pump 914 to a high-pressure plenum 920, increase the potential for failure and leakage.

FIG. 9B illustrates improvements and simplifications that reduce, or eliminate, some of the opportunities for failure of some of the critical components. As the fluid is heated in the core 902, it rises into the hot pool 904 as in FIG. 9A and flows into the one or more heat exchangers 908. Upon exiting the bottom of the heat exchanger 908, the fluid enters the cold pool 910, which is much larger and avoids the use of an intermediate pool. As can be seen in comparison with FIG. 9A, the suction plenums 912 have been eliminated and the primary sodium pump 914 is able to draw fluid directly from the cold pool 910 to a top inlet. Eliminating the suction plenums 912 reduces complexity and fabrication costs of internal components. Moreover, orienting the primary sodium pump 914 with a top inlet 924 and a bottom outlet 926 allows the pump to work in cooperation with gravitational forces, rather than pumping against gravity, as is typical.

A pump tank 922 provides draw down volume and eliminates the prior sealing surfaces between the hot pool 904 and the cold pool 910, thus further simplifying the design and construction. The open nature of the cold pool 910 provides simplified flow paths and reduces fabricated components and improves sodium volume. The configuration of the primary sodium pump 914 further allows greater factory fabrication and modularity of the components within the reactor vessel 900.

The disclosure sets forth example embodiments and, as such, is not intended to limit the scope of embodiments of the disclosure and the appended claims in any way. Embodiments have been described above with the aid of functional building blocks illustrating the implementation of specified components, functions, and relationships thereof. The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the disclosure that others can, by applying knowledge of those of ordinary skill in the art, readily modify and/or adapt for various applications such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the disclosure should not be limited by any of the above-described example embodiments, but should be defined only in accordance with the following claims and their equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The specification and drawings disclose examples of systems, apparatus, devices, and techniques that may allow modules of a nuclear reactor to be fabricated in a manufacturing facility and shipped to a construction site, where the modules can be assembled, thereby greatly reducing on-site fabrication complexity and cost. Further, the systems of the nuclear reactor have been simplified and further promote factory fabrication in lieu of on-site fabrication.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not restrictive. Although specific terms are employed herein, they are used in a generic and descriptive sense only, and not used for purposes of limitation.

Unless otherwise noted, the terms "connected to" and "coupled to" (and their derivatives), as used in the specification, are to be construed as permitting both direct and indirect (i.e., via other elements or components) connection. In addition, the terms "a" or "an," as used in the specification, are to be construed as meaning "at least one of." Finally, for ease of use, the terms "including" and "having" (and their derivatives), as used in the specification, are interchangeable with and have the same meaning as the word "comprising."

From the foregoing, and the accompanying drawings, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A nuclear reactor vessel, comprising:
   a support cylinder having a cylinder axis, the support cylinder configured to support a nuclear reactor core therein, the support cylinder located within the nuclear reactor vessel at a position that the cylinder axis is offset from a center of the nuclear reactor vessel, wherein the nuclear reactor vessel has a vessel head and one or more penetrations through the vessel head to accommodate a heat exchanger inlet; and
   an in-vessel storage system coupled to an outside of the support cylinder, the in-vessel storage system comprising an upper plate defining a plurality of holes each for receiving a core assembly and a lower plate configured to support the core assembly, wherein the in-vessel storage system is a separate component from the support cylinder and configured to store a plurality of core assemblies.

2. The nuclear reactor vessel as in claim 1, wherein the in-vessel storage system is a ring that extends at least partially circumferentially about the support cylinder.

3. The nuclear reactor vessel as in claim 1, wherein the in-vessel storage system is not concentric about the support cylinder.

4. The nuclear reactor vessel as in claim 3, wherein the in-vessel storage system is configured to be installed next to the support cylinder.

5. The nuclear reactor vessel as in claim 1, wherein the in-vessel storage system is configured to be attached to the support cylinder at a nuclear construction site.

6. The nuclear reactor vessel as in claim 1, wherein the support cylinder is pre-assembled with internal components prior to shipping.

7. The nuclear reactor vessel as in claim 1, further comprising one or more heat exchangers disposed in an upper half of the nuclear reactor vessel and wherein the in-vessel storage system is located vertically underneath at least a portion of the one or more heat exchangers.

8. The nuclear reactor vessel as in claim 1, further comprising a central core region within the support cylinder and wherein the in-vessel storage system is located outside the support cylinder.

9. The nuclear reactor vessel as in claim 1, wherein the support cylinder and the in-vessel storage system of the nuclear reactor vessel are modular and configured to be shipped over land for assembly at an installation site.

10. The nuclear reactor vessel as in claim 1, further comprising the nuclear reactor core disposed within the support cylinder, the nuclear reactor core having a core central axis and wherein the core central axis is off center with respect to the nuclear reactor vessel.

* * * * *